United States Patent [19]

Rose

[11] 4,441,578

[45] Apr. 10, 1984

[54] ENCAPSULATED BULK ABSORBER ACOUSTIC TREATMENTS FOR AIRCRAFT ENGINE APPLICATION

[75] Inventor: Philip M. Rose, Chula vista, Calif.

[73] Assignee: Rohr Industries, Inc., Chula Vista, Calif.

[21] Appl. No.: 399,498

[22] Filed: Jul. 19, 1982

Related U.S. Application Data

[63] Continuation of Ser. No. 230,546, Feb. 2, 1981, abandoned.

[51] Int. Cl.³ .............................................. F01N 1/24
[52] U.S. Cl. ................................... 181/222; 181/288; 181/290
[58] Field of Search ........ 181/222, 224, 288, 290–292; 52/145; 428/117

[56] References Cited

U.S. PATENT DOCUMENTS

| | | | |
|---|---|---|---|
| 3,095,943 | 7/1963 | Kemp | 181/292 |
| 4,001,473 | 1/1977 | Cook | 181/292 X |
| 4,174,020 | 11/1979 | Challis | 181/292 X |
| 4,194,329 | 3/1980 | Wendt | 52/145 |

Primary Examiner—Benjamin R. Fuller
Attorney, Agent, or Firm—Patrick J. Schlesinger; Frnak D. Gilliam

[57] ABSTRACT

A sandwich type acoustical absorbing panel for use adjacent to high speed gas flow areas in and around the engines of high speed aircraft. The panel in one embodiment comprises an imperforate facing sheet including having upright side and end walls, the inner volume of the panel and upright side and end walls are divided by means of partitions into a plurality of individual cavities or cells, each of the plurality of individual cavities or cells are filled with a bulk absorber material having many small torturous air passages, such as, open celled foam, fiberglass, felts or the like, the bulk absorber filling each cavity or cell is encapsulated in a membrane of thin limp material for preventing bulk absorber contamination and a perforated sheet overlay for attaching to the side, end walls and partitions for containing the bulk absorber within the cavities or cells.

7 Claims, 4 Drawing Figures

U.S. Patent  Apr. 10, 1984  4,441,578
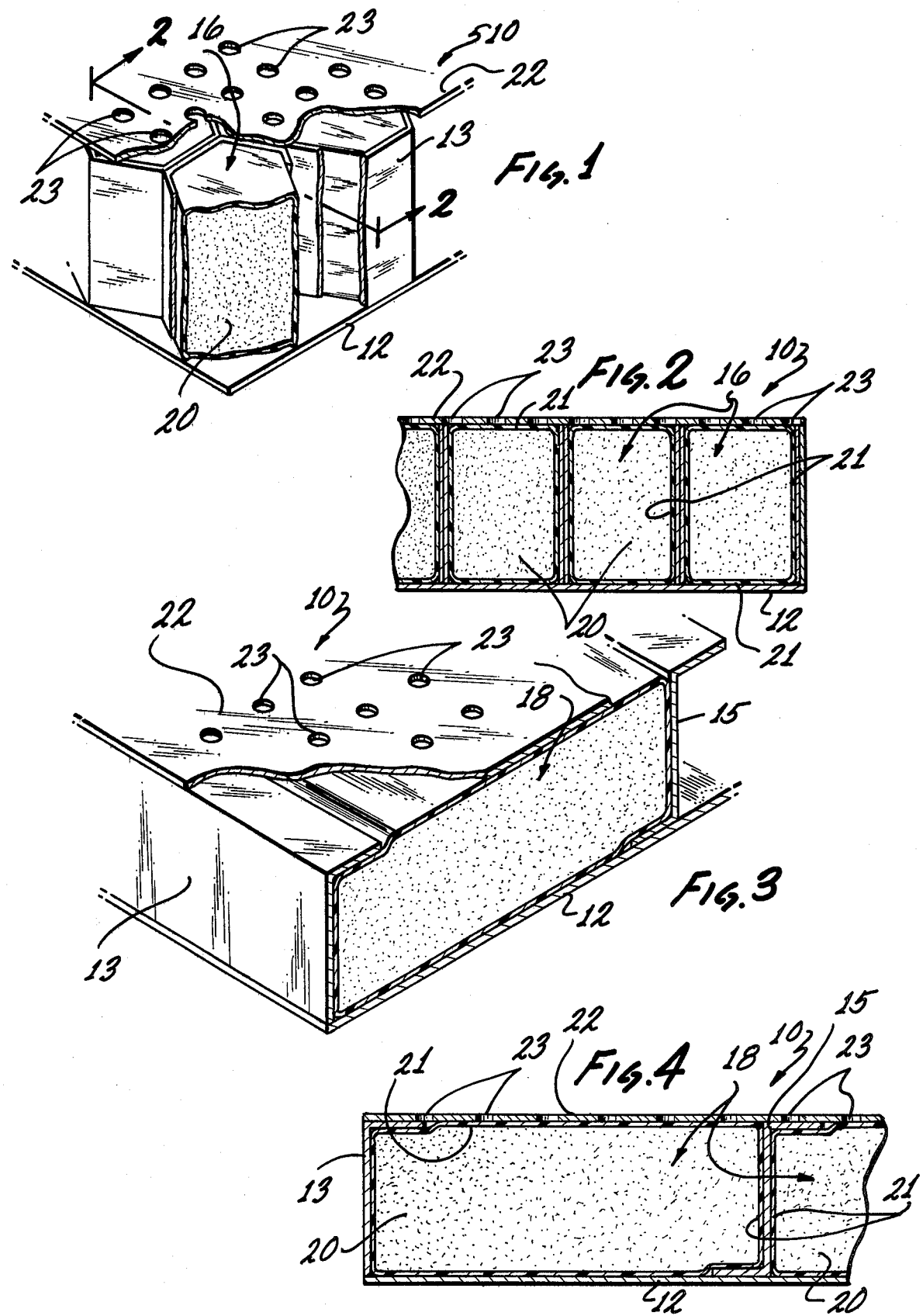

ENCAPSULATED BULK ABSORBER ACOUSTIC TREATMENTS FOR AIRCRAFT ENGINE APPLICATION

This is a continuation of application Ser. No. 230,546, filed Feb. 2, 1981, now abandoned.

BACKGROUND OF THE INVENTION

1. Field of Invention

This invention relates to acoustical panels, and more particularly to panels usable in and around high speed gas flow areas of aircraft including but not restricted to inlet liners for jet and turbo-jet engines.

2. Description of the Prior Art

A preliminary search directed to the subject matter of this invention revealed Fisher, U.S. Pat. No. 2,087,248; Schenk, U.S. Pat. No. 2,140,210 and Gildard III, et al, U.S. Pat. No. 3,115,948. These patents generally disclose sound absorbant materials including some of the elements found in the present invention, but none of the patents singularly or taken in combination suggest the combination of constitutant elements presently disclosed and claimed which have been found to yield superior sound absorbing qualities, resistance to severe environment, and eliminates penetration of foreign matter into the acoustic material.

Other U.S. Patents of general interest which were found in the search as follows:
U.S. Pat. No. 1,721,461 Mazer, July 16, 1929;
U.S. Pat. No. 1,824,240 Smith, Sept. 22, 1931;
U.S. Pat. No. 3,021,914 Wilson, Feb. 20, 1962;
U.S. Pat. No. 3,439,774 Callaway, et al, Apr. 22, 1969;
U.S. Pat. No. 3,905,443 Sluezac, Sept. 16, 1975.

SUMMARY OF THE INVENTION

It is an object of this invention to provide an improved sandwich type acoustical structure which permits sound to enter with a minimum of resistance and provides a high degree of sound absorption.

Another object of this invention is to provide an improved sandwich type acoustical structure which has sufficient mechanical strength for use in severe aircraft environments.

Still another object of this invention is to provide an improved sandwich type acoustic structure which is impervious to water, dust, chemical and various other encountered contaminants.

The illustrated embodiment of this invention comprises a base member with upright ending side and end walls, divider walls within the side and end wall confines to divide up the volume as defined by the base member, side and end walls into cells or cavities, bulk sound absorbing material is positioned within the cells or cavities, the bulk sound absorbing material being encapsulated in a membrane of thin flexible material to prevent contamination and a sheet of rigid perforate material that attaches to the upright side and end walls and divider walls for enclosing the cells or cavities and confining the encapsulated bulk sound absorbing material therein.

BRIEF DESCRIPTION OF THE DRAWINGS

FIG. 1 depicts an elevated perspective showing of an embodiment of the invention employing cellular core material.

FIG. 2 is a showing taken along line 2—2 of FIG. 1.

FIG. 3 depicts an elevated perspective showing of a second embodiment of the invention employing large open areas for receiving bulk absorbing material.

FIG. 4 is an end view of FIG. 3.

DESCRIPTION OF THE EMBODIMENTS

The same reference numerals are used throughout the drawings and specifications to denote the same element or part.

The acoustic panel of the instant invention is generally shown as 10. An imperforate base member 12 and side and end walls 13 are constructed of metal or non-metalic materials, such as, for example, aluminum, plastic, Kevlar ® or graphite. A central core structure 14 constructed of metalic materials or non-metalic materials is secured to the base member 12 by any conventional means, such as, for example, brazing, welding, adhesives or the like for metal to metal bonding or adhesives or the like for metal to plastic or plastic to plastic bonding. The central core structure depicted in FIG. 1, includes a plurality of small cells 16 commonly called honeycomb core material while FIG. 3 depicts a core material having large area cells 18 confined by rectangular upright walls 15.

Positioned within these cells whether 16 or 18 is bulk sound absorbing material 20. The absorbing material 20 is of a porous construction with a plurality of small torturous air passages therethrough and may be in the form of open celled foams, fiberglass, felt, such as Kevlar ® or the like or any other material found suitable for sound absorption.

The sound absorbing material 20 is encapsulated in a thin limp membrane 21 of approximately 0.002" thick. This membrane 21 will be sealed around the sound absorbing material to prevent any contaminant entering into the sound absorbing material. The membrane may be constructed of polyethylene, Mylar ®, natural rubber or the like.

Enclosing the upper surface of the cells is a perforated sheet 22 constructed of metal or non-metalic material, such as, but not limited to, aluminum, plastic or the like. The perforated sheet is attached to the cell material in the same or similar manner as the imperforate sheet to the cells discussed above.

The perforations 23 of the perforate sheet provide an effective open area as high as 50% or more. If the acoustic panel of the invention is to be utilized in a severe environment such as an engine inlet then the open area is reduced to enhance the overall strength of the structure. If the ultimate use of the panel is for decorative wall panels, such as, in an aircraft, then the effective open area is increased because there may be effectively no strength requirement.

In the construction of the panel, the face sheet, membrane and bulk absorber material are selected so that when combined they provide an efficient acoustic structure.

Although the foregoing has been described in some detail by way of ilustration and example, for the purpose of clarity of understanding, it should be understood that certain changes and modifications may be practiced within the spirit of the invention as limited only by the scope of the appended claims.

What is claimed as new and useful and desired to be secured by United States Letters Patent is:

1. Acoustic absorber panels having sufficient mechanical strength for use in severe aircraft engine environments comprising:

(a) a rigid imperforate backing sheet;
(b) a central structure defined by side and end walls having a plurality of individual endwise directed cells defined by rigid divider walls;
(c) a rigid perforated facing sheet having an effective open area not greater than 50%;
(d) sound absorption material positioned within said cells; and
(e) a thin limp membrane enclosing said sound absorption material;

said rigid divider walls extend between said backing and facing sheets.

2. The invention as defined in claim 1, wherein said acoustic absorber means is open-celled polyester-based urethane foam.

3. The invention as defined in claim 1, wherein said acoustic absorber means is batts of fiberglass.

4. The invention as defined in claim 1, wherein said acoustic absorber means is felt material.

5. The invention as defined in claim 1, wherein said thin limp membrane is polyethylene.

6. The invention as defined in claim 1 wherein said thin limp membrane is approximately 0.002 inches thick.

7. The invention as defined in claim 1 wherein the apparent open area of the combined perforation in said perforated sheet is at least 80%.

* * * * *